United States Patent
Moro et al.

(10) Patent No.: US 6,437,277 B1
(45) Date of Patent: Aug. 20, 2002

(54) WIRE ELECTRICAL DISCHARGE MACHINING APPARATUS

(75) Inventors: Toshio Moro; Seiji Satou, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,745

(22) PCT Filed: Oct. 19, 1998

(86) PCT No.: PCT/JP98/04708

§ 371 (c)(1),
(2), (4) Date: Jun. 16, 2000

(87) PCT Pub. No.: WO00/23221

PCT Pub. Date: Apr. 27, 2000

(51) Int. Cl.[7] ............................. B23H 1/00; B23H 7/10
(52) U.S. Cl. ............................................ 219/69.12
(58) Field of Search ............................. 219/69.12, 69.14

(56) References Cited

U.S. PATENT DOCUMENTS

| | | | | |
|---|---|---|---|---|
| 4,418,263 A | * | 11/1983 | Inoue | 219/69.12 |
| 4,766,280 A | * | 8/1988 | Groos | 219/69.12 |
| 5,073,690 A | * | 12/1991 | Corbin et al. | 219/69.12 |
| 5,162,630 A | * | 11/1992 | Iwasaki | 219/69.12 |
| 5,175,408 A | * | 12/1992 | Takashima | 219/69.12 |

FOREIGN PATENT DOCUMENTS

| | | | | |
|---|---|---|---|---|
| JP | 61-4624 | * | 1/1986 | 219/69.14 |
| JP | 62-110816 | | 5/1987 | |
| JP | 63-134116 | | 6/1988 | |
| JP | 63-260722 | | 10/1988 | |
| JP | 63-318217 A | * | 12/1988 | 219/69.14 |
| JP | 63-318218 | | 12/1988 | |
| JP | 63-318220 A | * | 12/1988 | 219/69.14 |
| JP | 1-228729 | | 9/1989 | |

OTHER PUBLICATIONS

International Search Report.

* cited by examiner

Primary Examiner—Geoffrey S. Evans
(74) Attorney, Agent, or Firm—Sughrue Mion, PLLC

(57) ABSTRACT

An upper guide and a lower guide are respectively disposed above and below a workpiece. The upper guide and the lower guide respectively has wire guides for guiding the wire electrode. A pair of electric supply dies are respectively provided in the upper guide and the lower guide and are adapted to come into contact with and energize the wire electrode. An internal nozzle and an external nozzle are provided in at least one of the upper guide and the lower guide. A first piping system supplies the working fluid to the internal nozzle and a second piping system supplies the working fluid to the external nozzle, where the second piping system is independent of the first piping system. The working fluid having lower temperature and higher pressure than the working fluid jetted out and supplied from the external nozzle is jetted out and supplied to the workpiece from the internal nozzle.

6 Claims, 8 Drawing Sheets

A-A SECTION

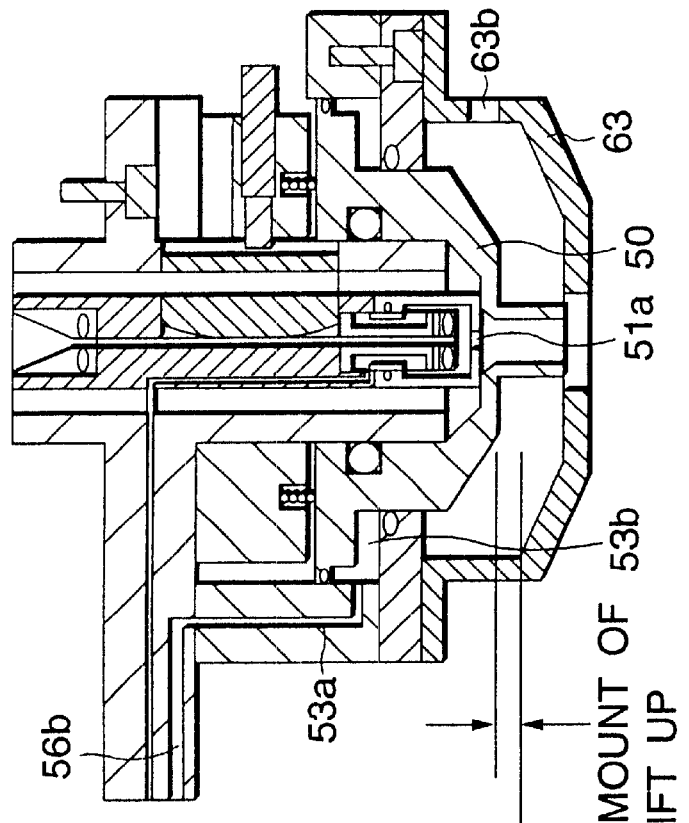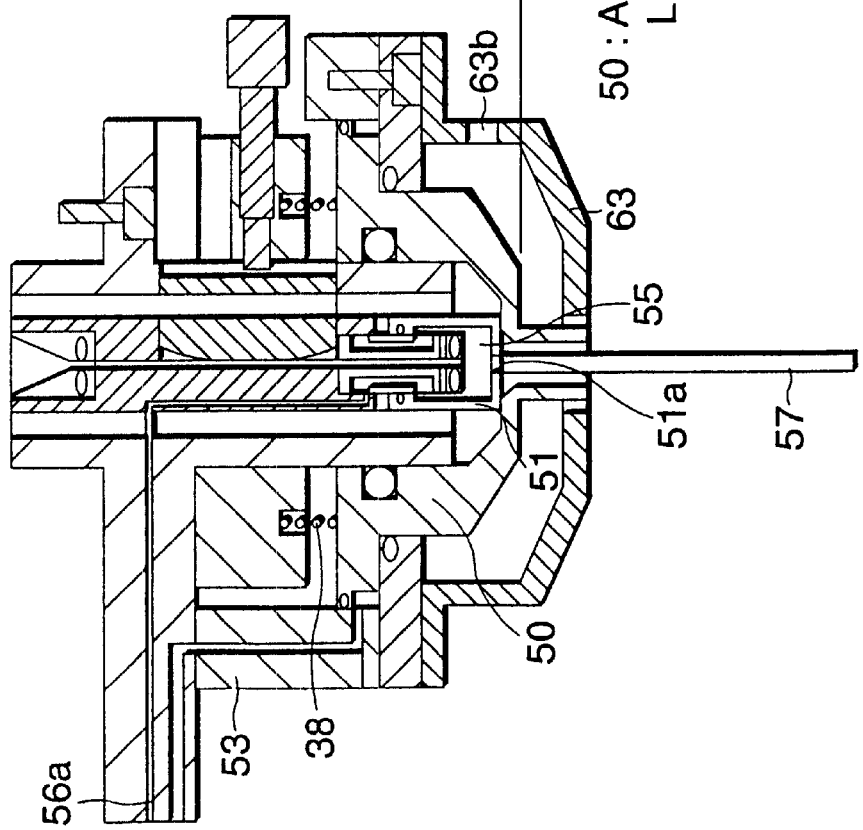

A-A SECTION

WIRE ELECTRICAL DISCHARGE MACHINING APPARATUS

TECHNICAL FIELD

The present invention relates to improvements in a wire electrical discharge machining apparatus which is capable of effectively promoting the cooling of a wire electrode and improving the machining speed.

BACKGROUND ART

Referring to FIGS. 5 to 8, a description will be given hereafter of the configuration and operation of a conventional wire electrical discharge machining apparatus.

FIG. 5 shows an overall configuration of mechanical portions, in which reference numeral 101 denotes a bed as a base of machine, and numeral 102 denotes an X-axis table. The X-axis table 102 is supported by an X-axis guide 103 on the bed 101, and is driven in the X-direction by an unillustrated X-axis motor through an X-axis ball screw 104. Numeral 105 denotes a table for fixing a workpiece 25, which is fixed on the X-axis table 102. Numeral 106 denotes a processing tank for storing a working fluid. Numeral 107 denotes a column for supporting a Z-axis unit 117, and a lower arm 108 is fixed thereto. A lower guide 109 is attached to a distal end portion of this lower arm 108. Numeral 118 denotes an upper guide, which is fixed to a distal end portion of the Z-axis unit 117. Numeral 111 denotes a Y-axis guide on the bed 101 which supports the column 107. The column 107 is driven in the Y-direction by a Y-axis motor 113 through a Y-axis ball screw 112. Numeral 114 denotes a wire collector for supporting a roller 115 for collecting a wire electrode 119, and the collected wire electrode 119 is accommodated in a collecting box 116. Numeral 120 denotes a wire bobbin, numeral 121 denotes a pad disposed underneath the bed 101, and numeral 122 denotes a leveling bolt for adjusting inclination.

FIG. 6 is a cross-sectional view illustrating the configuration of the lower guide 109. The lower guide 109 is fixed to a distal end of the lower arm 108 through an insulating plate 2, and is mainly comprised of a nozzle 6, an electric supply die 16, a lower wire guide holder 12, a guide supporting plate 23, and a lower block 3. The lower block 3 includes a roller 19 which functions to convert the direction of the wire electrode, and has a wire inlet 3a and a wire outlet 3b which are tapered. A collection pipe 20 is connected at the wire outlet 3b. The guide supporting plate 23 incorporates the electric supply die 16, and also incorporates a withdrawing plate 17 for withdrawing the electric supply die 16. The electric supply die 16 is fixed by a holding plate 15. Numeral 18 denotes a lower auxiliary guide, and the lower auxiliary guide 18, together with the lower wire guide holder 12, presses the wire electrode 119 against the electric supply die 16 so as to supply electricity to the wire electrode 119.

The nozzle 6 is a portion for jetting the working fluid, and the working fluid is supplied through a pipe 9 as a high-pressure fluid. Numeral 14 denotes a spring, and 13 denotes a holding plate for the nozzle 6. The nozzle 6 during machining is raised while compressing the spring 14, is stopped by the holding plate 13, and is returned downward when the working fluid ceases to be supplied. As a result, when machining is not being effected, the nozzle is lowered, thereby preventing its useless contact with the workpiece. A rectifying plate 22 has the function of rectifying the turbulence of the working fluid inside the nozzle, and a multiplicity of small holes 22a are provided therein. Numeral 10 denotes the wiring, which is connected to the guide supporting plate 23 formed of an electrically conductive material, so as to supply machining electric power from an unillustrated machining power supply to the electric supply die 16. Numeral 24 denotes a lower transporting-current jetting hole, to which a pipe from the outside is connected and which functions to transport the wire electrode 119 in the collection pipe 20 to the collection roller 115 (see FIG. 5), and is used mainly during the initial setting of the wire electrode 119. Numeral 26 denotes a machining gap between the workpiece 25 and the wire electrode 119, and this gap is referred to as the gap between the electrodes. The working fluid jetted from the nozzle 6 is supplied to the gap 26 between electrodes. The principal functions of the working fluid are, among others, to discharge the machining sludge produced during machining and to prevent the overheating of the wire electrode, and the working fluid is an essential element in preventing the disconnection of the wire electrode during machining.

FIG. 7 is a cross-sectional view illustrating the configuration of the upper guide 118. An attaching plate 225 fixes the upper guide 118 to the Z-axis unit 117 and is formed of an insulating material. An upper block 226 has a passage 226a, and an upper auxiliary guide 229 for guiding the wire electrode 119 is disposed on top of the upper block 226. An electric supply die 46 is accommodated in the interior of the upper block 226, and is pressed toward the wire electrode 119 by a pressing plate 230. The arrangement provided is such that the insertion and withdrawal of the electric supply die 46 are made possible by a withdrawing plate 47. An upper wire guide holder 236 is fixed to a lower end of the upper block 226, and a wire guide 236a is fixed to a distal end portion of the upper wire guide holder 236. Further, a housing 234 is provided in such a manner as to cover the upper wire guide holder 236, and a nozzle 232 is disposed on the outer side thereof. A jet nozzle 233, which is supported in such a manner as to be vertically movable through a spring 235, is accommodated inside the housing 234.

When the working fluid is supplied to a jet pipe 238, the jet nozzle 233 moves downward by its pressure while pressing the spring 235, and jets out a jet stream 239 through a jetting hole 233a in the jet nozzle 233. The wire electrode 119 passes through the interior of the jet stream 239, and is guided to the lower guide located therebelow. During normal machining, the working fluid is supplied from a working fluid pipe 237, and the working fluid jets out from a jetting hole 232a in the nozzle 232, and is supplied to the workpiece 25. In addition, during normal machining, the jet nozzle 233 is retracted upward by the spring 235. Numeral 221 denotes a cooling hole through which the working fluid is guided into the interior of the upper wire guide holder 236 to cool the wire electrode 119 during machining. Numeral 234a denotes a fixed throttle which is used to rectify the disturbance of the working fluid supplied from the working fluid pipe 237.

The wire electrical discharge machining apparatus is cooled by the working fluid because a large electric current flows across the contacting portions of the wire electrode and the electric supply die, and the temperature of these portions becomes high, possibly resulting in the disconnection of the wire electrode. The cooling working fluid is supplied to the wire passage 226a from the cooling hole 221 provided in the upper wire guide holder 236 by making use of the back pressure within the nozzle 232. The working fluid rises upward from the cooling hole 221 through the interior of the wire passage 226a, passes the contacting portions of the wire electrode 119 and the electric supply die 46, passes the upper auxiliary guide 229, and is discharged to the outside. Thus, as the working fluid passes, cooling is effected by absorbing Joule heat produced in the contacting portions of the wire electrode and the electric supply die.

Next, referring to FIG. 8, a description will be given of the arrangement of the wire electrode and a machining groove during machining. It is assumed that machining is being effected while maintaining a fixed gap in the direction toward the machining/advancing direction in the drawing. Jet streams 240 jet out from the upper and lower nozzles as indicated by the arrows, come into contact with each other substantially in the vicinity of the center in the vertical direction of the workpiece 25, and flow toward a groove 26b located rearwardly in the machining direction.

To increase the machining speed, it is necessary to increase the working electric current and to promote the cooling of the contacting portions of the wire electrode and the electric supply die. However, there is a limit to the cooling method which makes use of the back pressure within the nozzle, as shown in FIG. 7. Namely, if the workpiece and the nozzle are dissociated from each other and the back pressure drops, cooling becomes insufficient, with the result that there occur problems such as the occurrence of disconnection of the wire electrode and the occurrence of loading due to the wear sludge of the wire electrode caused by the temperature rise at the contacting portions between the wire electrode and the electric supply die. Further, in the conventional configuration, a multiplicity of small-diameter holes (the small-diameter holes 22a in the lower guide in FIG. 6 and the fixed throttles 234a in the upper guide in FIG. 7) are provided inside the nozzles for the purpose of rectification. Hence, pressure loss has been very large in these portions, and the cooling capacity between the electrodes has therefore been lowered.

In addition, if the machining speed is increased, the amount of machining sludge which is discharged increases, and when the production and discharge of the machining sludge fail to balance, the gap between the electrodes become contaminated, which causes the resistance at the machining gap to decline and increases the machining groove, with the result that the machining accuracy declines. In this case, it is conceivable to increase the pressure of the working fluid to promote the discharge of the machining sludge, but if the pressure of the working fluid is increased, the linear velocity of the working fluid between the wire electrode and the workpiece becomes high, so that there are cases where the working fluid is removed from side walls of the workpiece and the wire electrode, causing a hindrance to machining. Namely, if the working fluid is removed from the side walls of the workpiece and the wire electrode, the working electric current ceases to flow stably, so that there arises the problem of disconnection of the wire electrode. Thus, there is a limit to increasing the pressure of the working fluid.

Further, since the cross section of the conventional wire electrode is circular and the surface is smooth, the cooling efficiency based on heat transfer is low. Hence, in a case where a desired cooling effect cannot be obtained even if the working fluid is supplied at high speed, there have been cases where the machining speed has to be lowered to prevent the disconnection of the wire.

DISCLOSURE OF THE INVENTION

The present invention has been made to overcome the above-described problems, and its object is to obtain a wire electrical discharge machining apparatus which is capable of effectively promoting the cooling of the wire electrode and of improving the machining speed.

A wire electrical discharge machining apparatus according to a first aspect of the invention comprises: an upper guide and a lower guide which are respectively disposed above and below a workpiece and respectively incorporate wire guides for guiding the wire electrode; a pair of electric supply dies respectively provided in the upper guide and the lower guide and adapted to come into contact with and energize the wire electrode; an internal nozzle and an external nozzle which are provided in at least one of the upper guide and the lower guide; a first piping system for supplying a working fluid to the internal nozzle; a second piping system for supplying the working fluid to the external nozzle, the second piping system being independent of the first piping system; a first cooler for cooling the working fluid which is supplied to the internal nozzle through the first piping system; and a second cooler for cooling the working fluid which is supplied to the external nozzle through the second piping system, wherein the working fluid having lower temperature and higher pressure than the working fluid jetted out and supplied from the external nozzle is jetted out and supplied to the workpiece from the internal nozzle.

As for the wire electrical discharge machining apparatus according to a second aspect of the invention, the wire electrical discharge machining apparatus according to the first aspect of the invention further comprises: jetting means for jetting the working fluid toward the wire electrode to cause the wire electrode to be pressed against the electric supply die, wherein the working fluid supplied to the jetting means is the same as the working fluid supplied to the internal nozzle.

As for the wire electrical discharge machining apparatus according to a third aspect of the invention, in the wire electrical discharge machining apparatus according to the first aspect of the invention, an antifreeze solution is mixed in the working fluid which is supplied to the internal nozzle, the antifreeze solution is cooled by the cooler, supercooled working solution at a temperature of 0° C. or lower is jetted out and supplied from the internal nozzle toward the workpiece.

The wire electrical discharge machining apparatus according to a fourth aspect of the invention comprises: an upper guide and a lower guide which are respectively disposed above and below the workpiece and respectively incorporate wire guides for guiding the wire electrode; a pair of electric supply dies respectively provided in the upper guide and the lower guide and adapted to come into contact with and energize the wire electrode; an internal nozzle and an external nozzle which are provided in at least one of the upper guide and the lower guide, the internal nozzle being adapted to jet out and supply high-pressure working fluid toward the workpiece, the external nozzle being adapted to jet out and supply toward the workpiece the working fluid having lower pressure than the high-pressure working fluid; a jet-stream generating means supported in such a manner as to be vertically movable around an outer peripheral portion of the wire guide, so as to guide the wire electrode from the upper guide to the lower guide by means of a jet stream; and an internal-nozzle driving means for supporting the internal nozzle in such a manner as to render the internal nozzle vertically movable, so as to drive the internal nozzle vertically through fluid pressure, wherein the internal nozzle is driven by the internal-nozzle driving means so as to drive the jet-stream generating means engaging with the internal nozzle.

The wire electrical discharge machining apparatus according to a fifth aspect of the invention comprises: an upper guide and a lower guide which are respectively disposed above and below the workpiece and respectively incorporate wire guides for guiding the wire electrode; a pair of electric supply dies respectively provided in the upper guide and the lower guide and adapted to come into contact with and energize the wire electrode; and an internal nozzle and an external nozzle which are provided in at least one of the upper guide and the lower guide, the internal nozzle being adapted to jet out and supply high-pressure working fluid toward the workpiece, the external nozzle being adapted to jet out and supply toward the workpiece the working fluid having lower pressure than the high-pressure working fluid, wherein a fin is provided on an outer peripheral portion of the wire electrode.

As for the wire electrical discharge machining apparatus according to a sixth aspect of the invention, in the wire electrical discharge machining apparatus according to the fifth aspect of the invention, the fin is inclined with respect to a central axis of the wire electrode.

BRIEF DESCRIPTION OF THE DRAWINGS

FIG. 3(a) and FIG. 3(b) are diagrams explaining the operation of a jet nozzle according to the first embodiment of the invention;

BEST MODE FOR CARRYING OUT THE INVENTION

First Embodiment

Figure 1A:
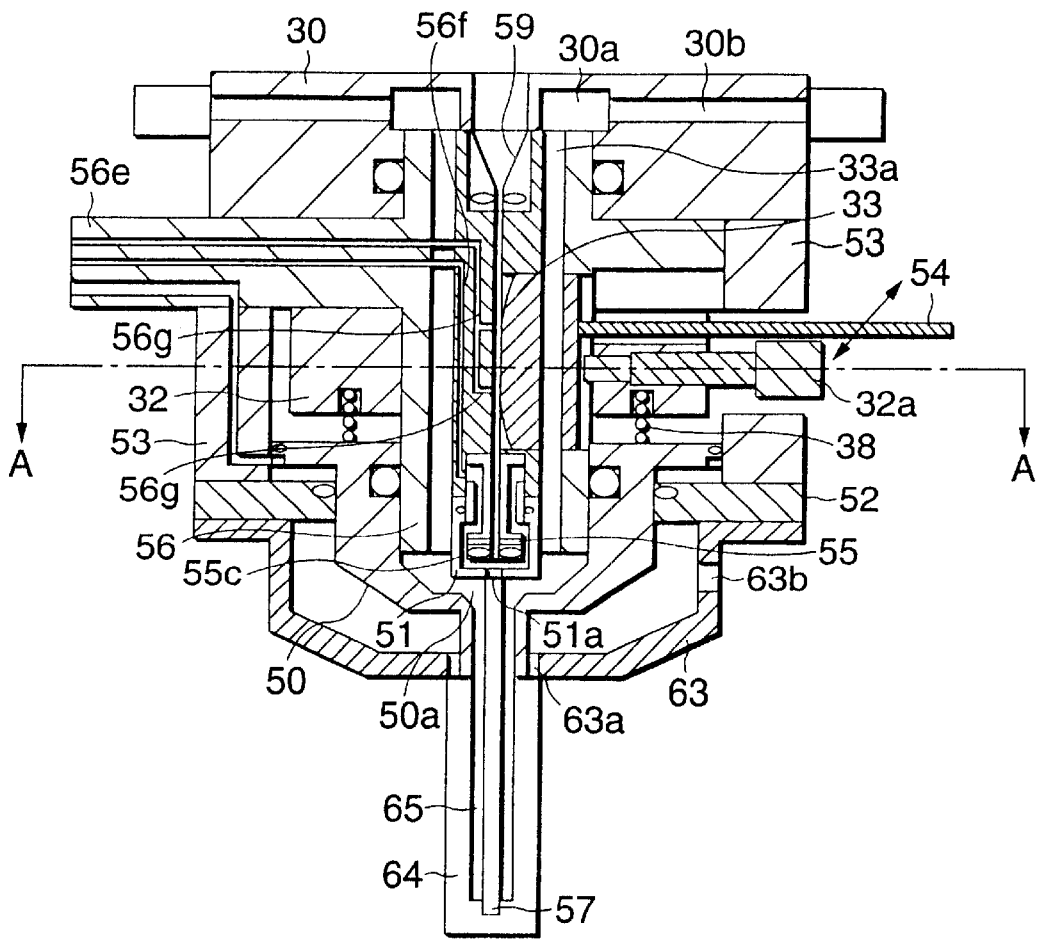
FIG. 1(a) and FIG. 1(b) are cross-sectional views of an upper guide according to a first embodiment of the invention.
Figure 1B:
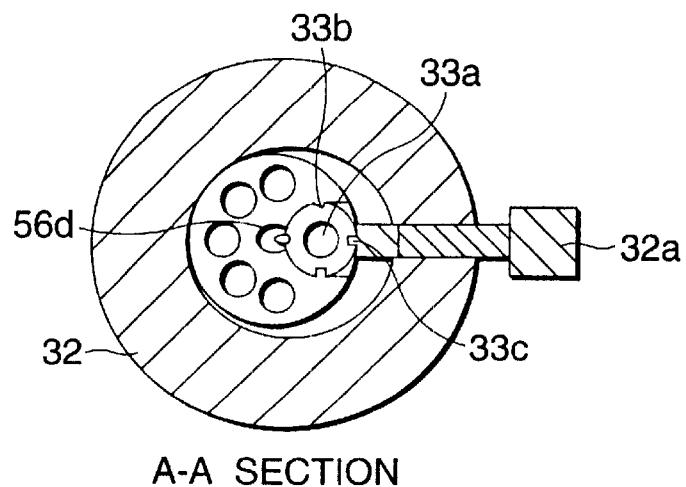
Figure 2:
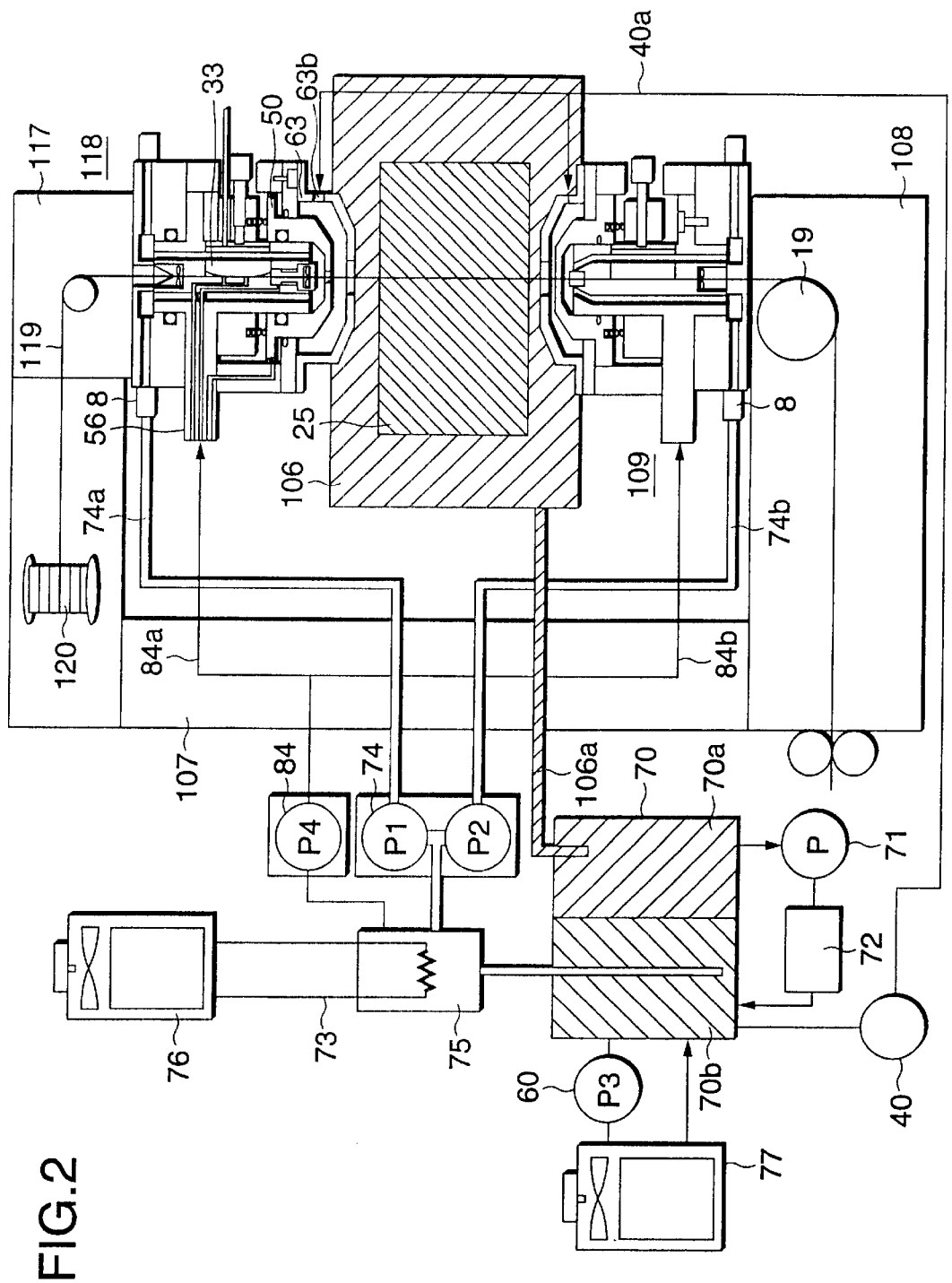
FIG. 2 is an overall schematic view illustrating the first embodiment of the invention.

Referring now to FIGS. 1 to 3, a description will be given of the configuration and operation of the wire electrical discharge machining apparatus according to a first embodiment of the invention.

FIG. 1 shows a cross section of an upper guide, in which pipelines 30b provided inside a supporting plate 30 are connected to a pipe for a working fluid supplied from the outside, and is connected toward a pool 30a disposed in the vicinity of the center. A guide holder 56 is fixed to a lower end face of the supporting plate 30. The guide holder 56 has a hole in which an electric supply die 33 is fitted, and has in its central portion a passage 56d for a wire electrode. The passage 56d of the wire electrode is a rectilinear pipeline passing through the interior of the guide holder 56, and an outlet in its lower end communicates with a jetting hole 50a. Reference numeral 59 denotes an auxiliary guide for the wire electrode, which is disposed in an upper portion, and a wire guide 55 is disposed in a lower portion. Numeral 32 denotes a doughnut-shaped ring which is movably disposed on the outer side of the guide holder 56, and numeral 32a denotes a bolt for pressing the electric supply die 33.

An internal nozzle 50 has an outer periphery formed in a flange shape, and that portion is engaged with a stopper 52, and the stopper 52 is fixed to the supporting plate 30 by means of a side plate 53. Numeral 38 denotes a spring which is interposed between the internal nozzle 50 and the ring 32, and acts in such a manner as to press the internal nozzle 50 downward. The internal nozzle 50 is fitted to an outer peripheral portion of the guide holder 56 and is slidable in the vertical direction, and the leakage of the working fluid is prevented by an O-ring.

The electric supply die 33 has a pipeline 33a in its central portion, has a contact electric supply portion 33b with respect to the wire electrode, and has on its side opposite to the contact electric supply portion 33b a groove 33c for rotating the electric supply die 33 itself from the outside by a lever 54 and the like. The supply of electricity is effected while the wire electrode and the electric supply die 33 are brought into contact with each other in a state in which the contact electric supply portion 33b of the electric supply die 33 is located at a position in which it is pushed in so that the wire electrode moves 1 mm or thereabouts toward the left-hand side in the drawing from a straight line connecting the center of the wire guide 55 and the center of the auxiliary guide 59.

An external nozzle 63 is provided on the outer side of the internal nozzle 50. An jetting port 50b is provided in a distal end portion of the internal nozzle 50 in such a manner as to overlap with a jetting hole 63a in the external nozzle, and the working fluid supplied from a connecting hole 63b in the external nozzle jets out from outside the jetting port 50b through the jetting hole 63a. Numeral 65 denotes a high-pressure jet stream jetted out from the internal nozzle 50, and has a slightly larger diameter than a jet stream 57. Numeral 64 denotes a low-pressure jet stream jetted out from the external nozzle 63, and has a slightly larger diameter than the aforementioned high-pressure jet stream 65. The working fluid is jetted out toward the workpiece in the form of a coaxial stream from the external nozzle 63 and the internal nozzle 50 during machining.

Numeral 51 denotes a jet nozzle, which is supported in such a manner as to be vertically movable around an outer peripheral portion of the wire guide 55, and is used to guide the wire electrode from the upper guide to the lower guide by the jet stream before machining. Numeral 51a denotes a jetting hole for jetting out a jet stream Although a description has been given above of the upper guide, the configuration of the lower guide is similar, so that a description thereof will be omitted.

FIG. 2 is an overall schematic view, and an upper guide 118 and a lower guide 109 are respectively provided in an upper section and a lower section of the machine body. Numeral 106 denotes a processing tank for storing the working fluid, and the working fluid is connected in a working fluid tank 70 by a pipe 106a and is recirculated. The working fluid tank 70 is comprised of a contaminated fluid tank 70a for temporarily storing the working fluid contaminated by the machining sludge after machining, as well as a clean fluid tank 70b for storing the working fluid filtered by a filter 72. Numeral 71 denotes a filtering pump.

Numeral 40 denotes a pump for supplying the working fluid in the clean fluid tank 70b to the connecting hole 63b in the external nozzle 63 through a pipe 40a. As a result, the low-pressure jet stream of the working fluid jets out from the external nozzle 63. The pump 60 recirculates and supplies the working fluid to a cooler 77 and serves to maintain the working fluid at a fixed temperature. Numeral 75 denotes a cooling tank, which is connected to the clean fluid tank 70b of the working fluid tank 70.

The cooling of the working fluid is effected by a cooler 76 through a cooling pipe 73. To the upper guide 118, for example, the working fluid cooled by the cooler 76 passes through a pipe 74a, a pipe end 8, the pipeline 30b (see FIG. 1) by means of a pump 74, and is jetted out from the jetting hole 50a (see FIG. 1) in the internal nozzle 50 in the form of a high-pressure jet stream. Meanwhile, the cooling working fluid is similarly supplied to the lower guide by passing through a pipe 74b, and the working fluid is jetted out from the internal nozzle.

Further, to the upper guide 118, for example, the working fluid cooled by the cooler 76 jets out to the passage 56d (see FIG. 1) for the wire electrode through a pipe 84a as well as a pipeline 56e, a pipeline 56f, and a pipeline 56g (see FIG. 1) provided inside the guide holder 56 by means of a pump 84. Meanwhile, the cooling working fluid is similarly supplied to the lower guide by passing through a pipe 84b, and the working fluid is jetted out to the passage of the wire electrode. As a result, the cooling of the contacting portions of a wire electrode 119 and the electric supply die 33 is promoted, and the wire electrode 119 is pressed against the electric supply die 33 by the working fluid, so that the wire electrode 119 during traveling is capable of maintaining a stable state of contact with the electric supply die 33.

The temperature of the high-pressure working fluid cooled by the cooler 76 and supplied to the internal nozzle 50 is lower than the temperature of the low-pressure working fluid cooled by the cooler 77 and supplied to the external nozzle 63, thereby enhancing the effect of cooling the wire electrode 119 and the electric supply die 33.

As described above, the arrangement provided is such that the nozzle is constructed with a double structure, a piping system for supplying the working fluid to the internal nozzle and a piping system for supplying the working fluid to the external nozzle are respectively made independent, the working fluid is cooled by separate coolers, low-temperature and high-pressure working fluid is supplied to the internal nozzle, and higher-temperature and lower-pressure working fluid than the working fluid supplied to the internal nozzle is supplied to the external nozzle. Consequently, it is possible to separate the supply of working fluid necessary for cooling and the supply of working fluid necessary for machining, and it is possible to reduce necessary energy to be charged.

Next, referring to FIG. 3, a description will be given of the operation of the jet nozzle. In FIG. 3(a), when the working fluid is supplied to a jet pipe 56a, the jet nozzle 51 is lowered by the action of the pressure, and concurrently jets out the jet stream 57 from the jetting hole 51a. Next, a description will be given of the method for accommodating the jet nozzle upward upon completion of the insertion of the wire. In FIG. 3(b), when the working fluid or another fluid is supplied to a pipe 56b for driving an internal nozzle, the fluid passes through a pipe 53a and is led to a chamber 53b. As a result, the spring 38 is compressed by the fluid pressure, and the internal nozzle 50 moves upward, so that the internal nozzle 50 pushes up the internal nozzle 50 with the jet nozzle 51 abutting against the inner bottom surface of the internal nozzle 50. Hence, the jet nozzle 51 returns to its position persisting prior to supplying the working fluid to the jet pipe 56a.

Figure 7:
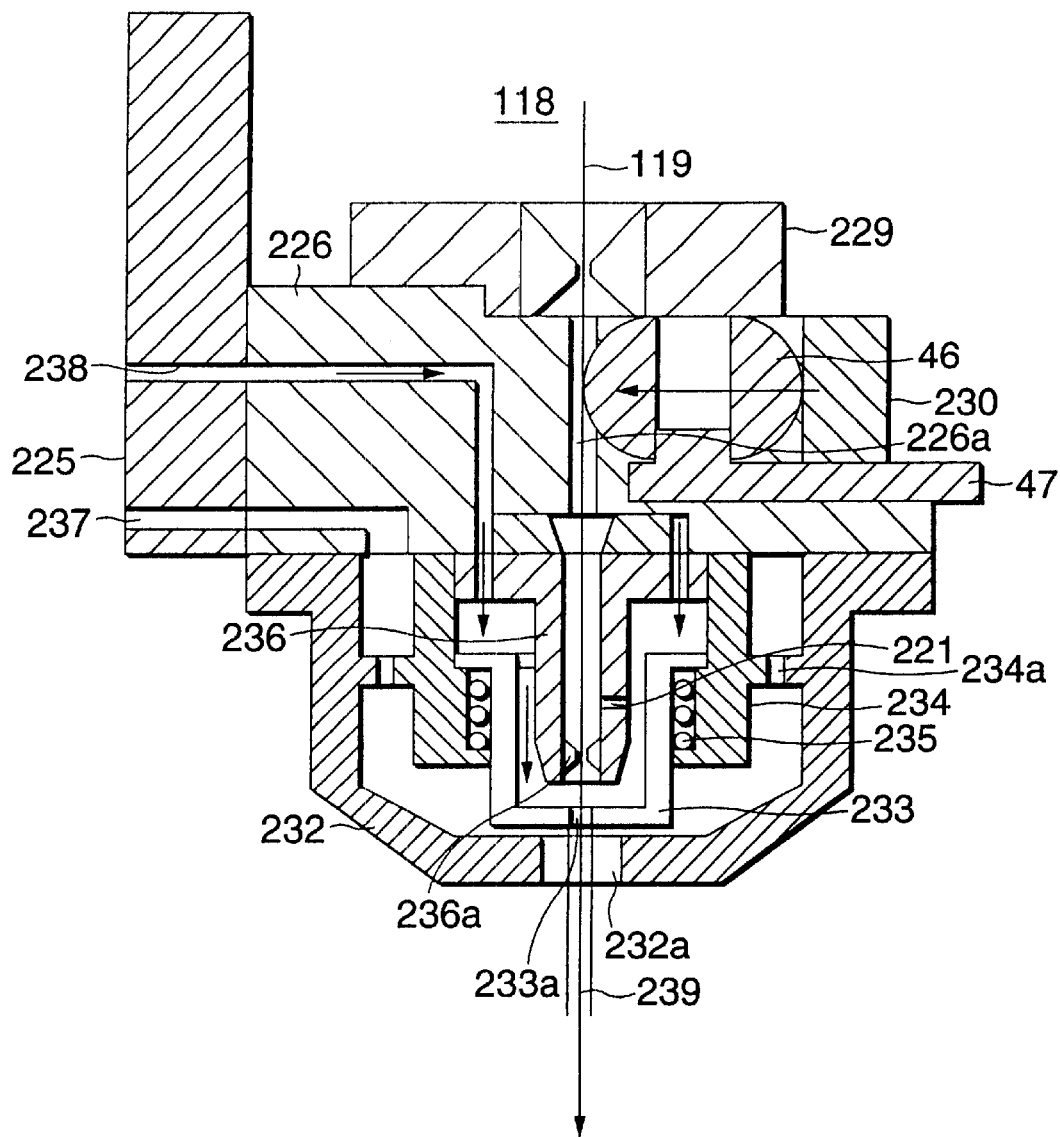
FIG. 7 is a cross-sectional view of an upper guide of the conventional wire electrical discharge machining apparatus.
Figure 8:
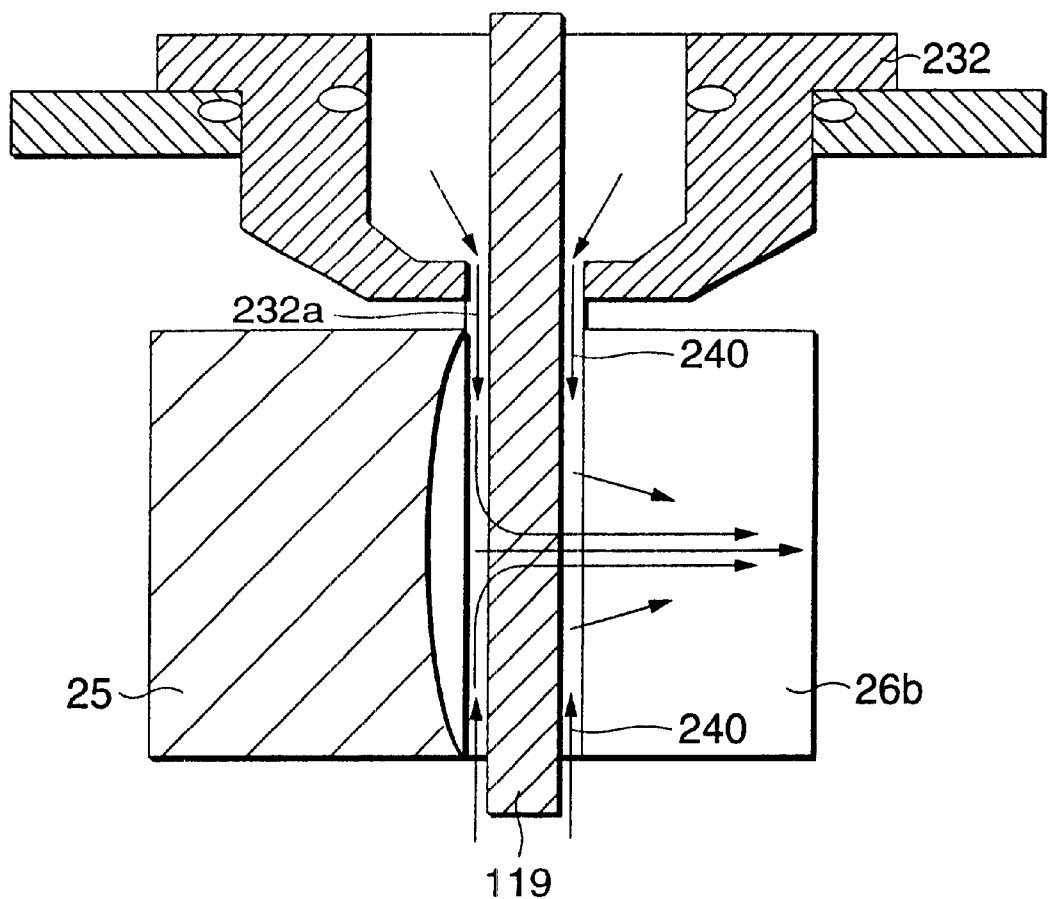
FIG. 8 is a diagram explaining the arrangement of a wire electrode and a machining groove during machining in the conventional wire electrical discharge machining apparatus.

The internal nozzle is driven by such an internal-nozzle driving means using fluid pressure so as to drive the jet nozzle which is a jet-stream generating means engaging with the internal nozzle, whereby it is possible to omit parts surrounding the jet nozzle, including a spring for vertically driving the jet nozzle and a housing, such as those shown in FIG. 7 illustrating the background art. Accordingly, since the flow of the working fluid inside the internal nozzle in the double nozzle suited for effective cooling (e.g., the flow of the working fluid from the pipeline 30b to the jetting hole 50a through the pool 30a in FIG. 1) is not hampered, it is possible to reduce the pressure loss and allow the working fluid having a large streamline velocity to jet out from the internal nozzle. Hence, it is possible to further improve the machining speed.

Second Embodiment

In addition, although in FIG. 2 illustrating the first embodiment a description has been given of the case in which machining is effected with the overall workpiece 25 immersed in the working fluid in the processing tank 106, such immersion machining has the characteristic that it is possible to effect stable machining while maintaining the supply of the working fluid to the gap between the electrodes, but the overall apparatus becomes large-scaled and expensive.

In the example of FIG. 2 as well, by using the upper guide and the lower guide such as those shown in FIG. 1, and by supplying the working fluid with the temperature, pressure, and flowrate that are necessary for the internal nozzle and the external nozzle, respectively, depending on the machining conditions, it is possible to effect stable machining not by immersion machining but in a working-fluid spraying condition, and it is possible to manufacture the overall apparatus inexpensively.

Third Embodiment

Although, in the first embodiment, a method has been shown in which effective cooling is performed by setting only the high-pressure jet stream from the internal nozzle to low temperature, the working fluid which is generally used in wire electrical discharge machining is deionized water, and although the high-pressure jet stream from the internal nozzle is set to low temperature, it cannot be set to be 0° C. or lower. Accordingly, to increase the cooling efficiency further, an antifreeze solution may be mixed in the working fluid, and the working fluid with the antifreeze solution mixed therein may be cooled to 0° C. or lower by the cooler 76 shown in FIG. 2, so as to supply supercooled working fluid to the gap between the electrodes.

The cooling of the wire electrode is further promoted by supplying the supercooled working fluid to the gap between the electrodes, thereby further improving the machining speed.

Fourth Embodiment

Figure 4A:
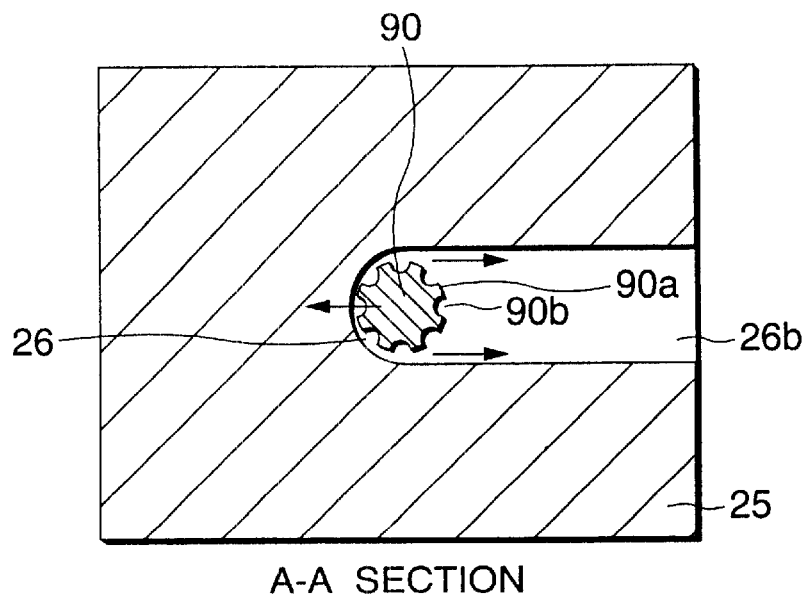
FIG. 4(a) and FIG. 4(b) are cross-sectional views illustrating a fourth embodiment of the invention.
Figure 4B:
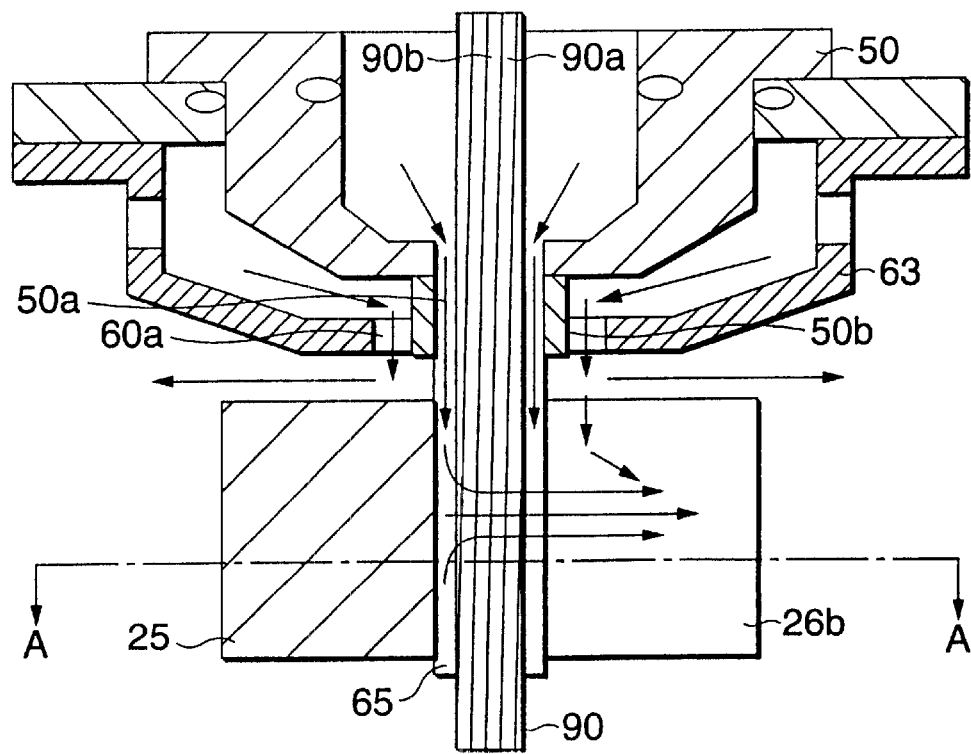
Figure 5:
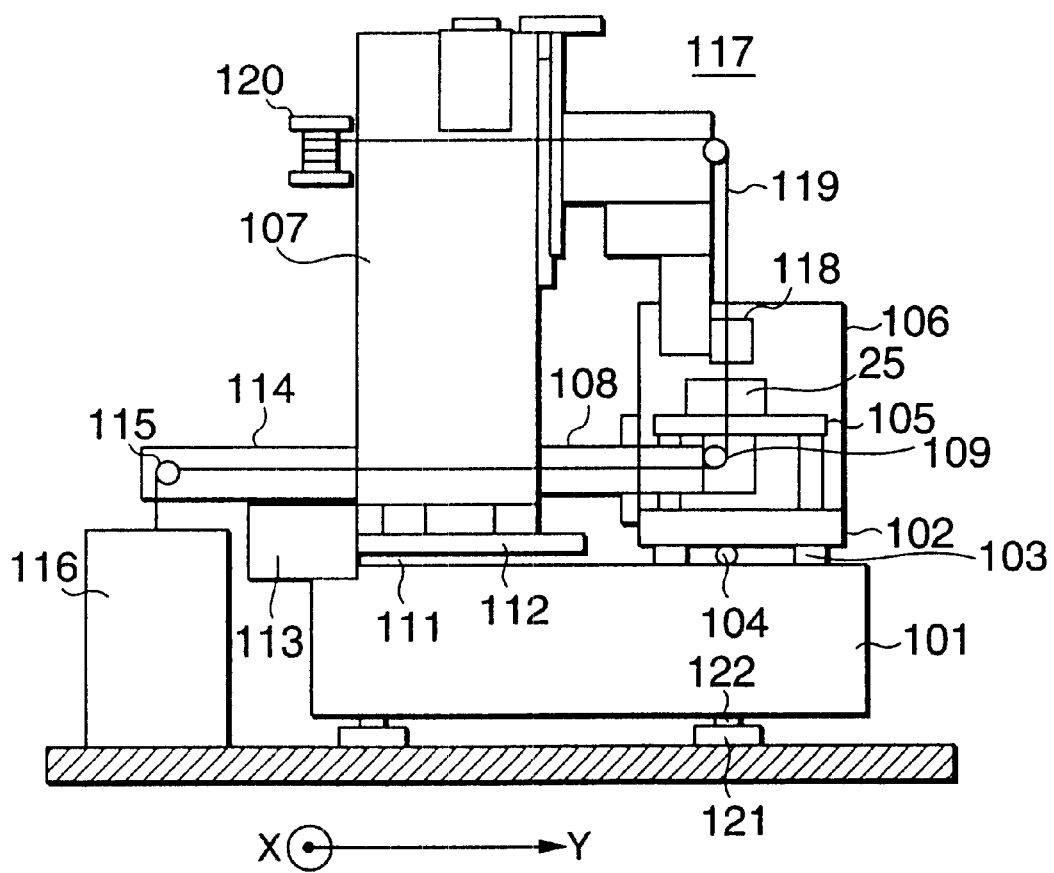
FIG. 5 is an overall schematic view of mechanical portions of a conventional wire electrical discharge machining apparatus.
Figure 6:
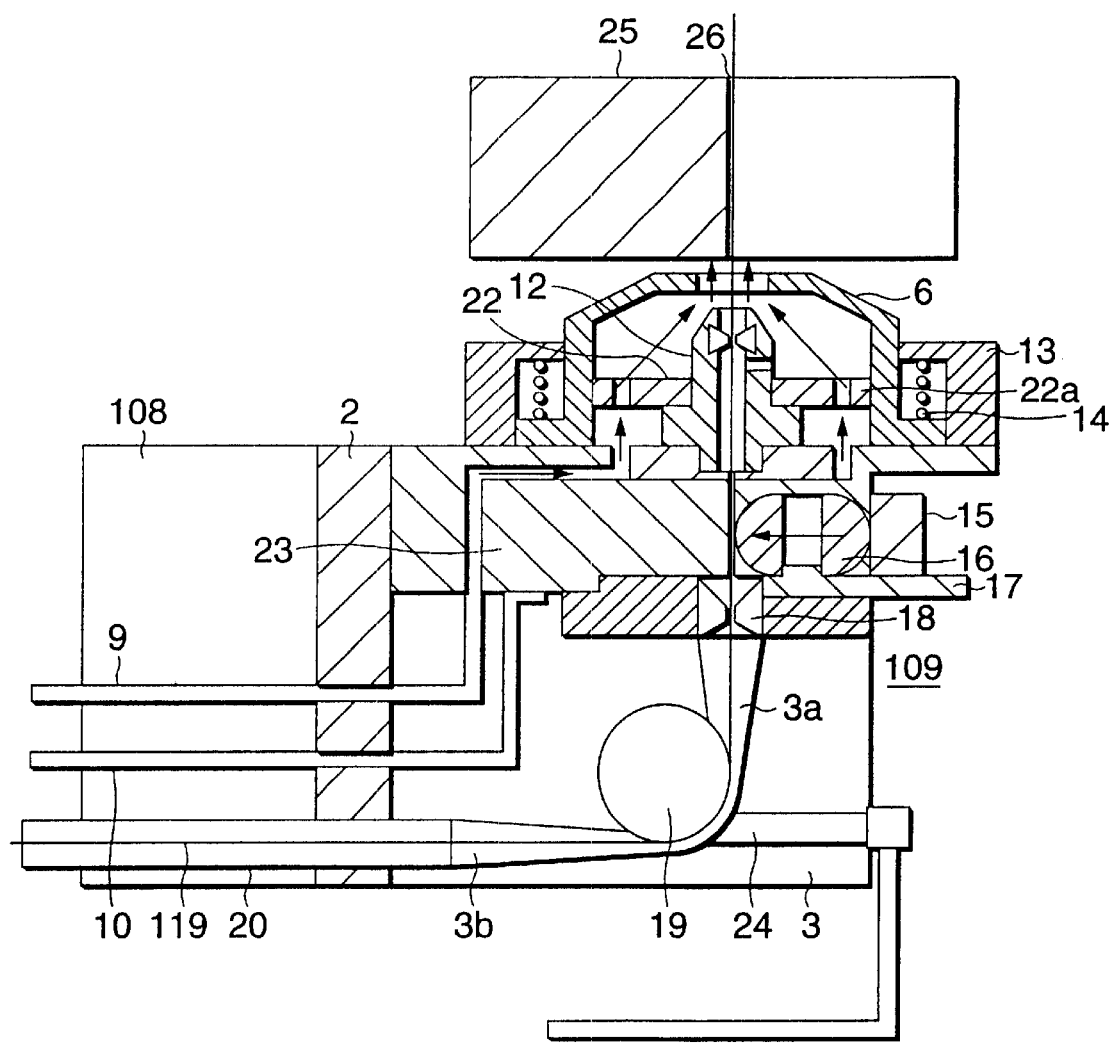
FIG. 6 is a cross-sectional view of a lower guide of the conventional wire electrical discharge machining apparatus.

FIG. 4 is a cross-sectional view illustrating a fourth embodiment of the invention. As shown in the part (a) of FIG. 4, a wire electrode 90 has a shape different from that of a conventional wire electrode having a circular cross section, and this wire electrode 90 has fins 90a and grooves 90b on its outer periphery. The shape of the fin 90a suffices if it is capable of increasing the heat transfer area, such as a triangular shape, a trapezoidal shape, a curvilinear shape as in the case of a gear, as seen in the cross-sectional view as in the part (a) of FIG. 4. Thus, since the wire electrode 90 has an enlarged heat transfer surface, the efficiency of cooling the wire electrode based on heat transfer to the cooling fluid becomes high, so that the working electric current can be increased further, thereby further improving the machining speed.

In addition, as shown in the part (b) of FIG. 4, if the wire electrode 90 is seen in a side view, the fin 90a is formed in an inclined manner with respect to the central axis of the wire electrode and is helical. Thus, since the fins 90a and the grooves 90b are inclined with respect to the central axis of the wire electrode, it is possible to promote the discharge of machining sludge generated in a gap 26 between the electrodes as the wire electrode travels. The reason is that in the case where the grooves are provided which are inclined with respect to the central axis of the wire electrode, the movement of the working fluid toward a rearward groove 26b is further promoted by the rotational motion of the working fluid than in the case where the outer peripheral portion of the wire electrode is smooth.

In the wire electrical discharge machining apparatus according to a first aspect of the invention, the arrangement provided is such that the nozzle is constructed with a double structure, a piping system for supplying the working fluid to the internal nozzle and a piping system for supplying the working fluid to the external nozzle are respectively made independent, the working fluid is cooled by separate coolers, low-temperature and high-pressure working fluid is supplied to the internal nozzle, and higher-temperature and lower-pressure working fluid than the working fluid supplied to the internal nozzle is supplied to the external nozzle consequently, it is possible to separate the supply of working fluid necessary for cooling and the supply of working fluid necessary for machining. Hence, there is an advantage in that it is possible to reduce necessary energy to be charged on the whole. In addition, since the low-temperature and high-pressure working fluid is jetted out and supplied from the internal nozzle toward the workpiece, the wire electrode can be effectively cooled. Hence, there is an advantage in that the working electric current can be increased further, thereby further improving the machining speed. Furthermore, it is possible to effect stable machining not by immersion machining but in a working-fluid spraying condition, so that there is an advantage in that it is possible to manufacture the overall apparatus inexpensively.

As for the wire electrical discharge machining apparatus according to a second aspect of the invention, the wire electrical discharge machining apparatus according to the first aspect of the invention further comprises: jetting means for jetting the working fluid toward the wire electrode to cause the wire electrode to be pressed against the electric supply die, wherein the working fluid supplied to the jetting means is the same as the working fluid supplied to the internal nozzle. Therefore, in addition to the advantages of the first aspect of the invention, there is an advantage in that since the cooling of the contacting portions between the wire electrode and the electric supply die is promoted, the machining speed can be further improved, and since the wire electrode is pressed against the electric supply die, the state of contact between the wire electrode during running and the electric supply die can be maintained stably.

As for the wire electrical discharge machining apparatus according to a third aspect of the invention, in the wire electrical discharge machining apparatus according to the first aspect of the invention, an antifreeze solution is mixed in the working fluid which is supplied to the internal nozzle, the antifreeze solution is cooled by the cooler, and super-cooled working solution at a temperature of 0° C. or lower is jetted out and supplied from the internal nozzle toward the workpiece. Therefore, in addition to the advantages of the first aspect of the invention, there is an advantage in that the cooling of the wire electrode is further promoted, and the working electric current necessary for machining can be further increased, thereby making it possible to further improve the machining speed.

The wire electrical discharge machining apparatus according to a fourth aspect of the invention comprises: an internal-nozzle driving means for supporting the internal nozzle and the jet nozzle in such a manner as to render the internal nozzle and the jet nozzle vertically movable, so as to drive the internal nozzle vertically through fluid pressure, wherein the internal nozzle is driven by the internal-nozzle driving means so as to drive the jet-stream generating means engaging with the internal nozzle. Therefore, there are advantages in that it is possible to omit parts surrounding the jet nozzle, including a spring for vertically driving the jet nozzle and a housing, and that since the flow of the working fluid inside the internal nozzle is not hampered, it is possible to reduce the pressure loss and allow the working fluid having a large streamline velocity to jet out from the internal nozzle, thereby making it possible to improve the machining speed.

In the wire electrical discharge machining apparatus according to a fifth aspect of the invention, in the double nozzle structure suited for high-speed machining, the wire electrode has on its outer peripheral portion an enlarged heat transfer surface based on fins. Therefore, there is an advantage in that the efficiency of cooling the wire electrode based on the heat transfer to the cooling fluid becomes high, and the working electric current can be further increased, thereby making it possible to further improve the machining speed.

As for the wire electrical discharge machining apparatus according to a sixth aspect of the invention, in the wire electrical discharge machining apparatus according to the fifth aspect of the invention, the fins are inclined with respect to the central axis of the wire electrode. Therefore, in addition to the advantages of the fifth aspect of the invention, there is an advantage in that it is possible to promote the discharge of the machining sludge occurring in the gap between the electrodes, thereby making it possible to further improve the machining speed.

INDUSTRIAL APPLICABILITY

As described above, the wire electrical discharge machining apparatus according to the invention is suitable for use in wire electrical discharge machining operations since it is capable of effectively promoting the cooling of the wire electrode and of improving the machining speed.

What is claimed is:

1. A wire electrical discharge machining apparatus in which a working fluid is interposed between a wire electrode and a workpiece to machine the workpiece by electrical discharge, comprising:

an upper guide and a lower guide which are respectively disposed above and below the workpiece and respectively incorporate wire guides for guiding said wire electrode;

a pair of electric supply dies respectively provided in said upper guide and said lower guide and adapted to come into contact with and energize said wire electrode;

an internal nozzle and an external nozzle which are provided in at least one of said upper guide and said lower guide;

a first piping system for supplying the working fluid to said internal nozzle;

a second piping system for supplying the working fluid to said external nozzle, said second piping system being independent of said first piping system;

a first cooler for cooling the working fluid which is supplied to said internal nozzle through said first piping system; and a second cooler for cooling the working fluid which is supplied to said external nozzle through said second piping system, wherein the working fluid having lower temperature and higher pressure than the working fluid jetted out and supplied from said external nozzle is jetted out and supplied to the workpiece from said internal nozzle.

2. The wire electrical discharge machining apparatus according to claim 1, further comprising: jetting means for jetting the working fluid toward said wire electrode to cause said wire electrode to be pressed against said electric supply die, wherein the working fluid supplied to said jetting means is the same as the working fluid supplied to said internal nozzle.

3. The wire electrical discharge machining apparatus according to claim 1, wherein an antifreeze solution is mixed in the working fluid which is supplied to said internal nozzle, the antifreeze solution is cooled by said cooler, and supercooled working solution at a temperature of 0° C. or lower is jetted out and supplied from said internal nozzle toward the workpiece.

4. A wire electrical discharge machining apparatus in which a working fluid is interposed between a wire electrode and a workpiece to machine the workpiece by electrical discharge, comprising:

an upper guide and a lower guide which are respectively disposed above and below the workpiece and respectively incorporate wire guides for guiding said wire electrode;

an internal nozzle and an external nozzle which are provided in at least one of said upper guide and said lower guide, said internal nozzle being adapted to jet out and supply high-pressure working fluid toward the workpiece, and said external nozzle being adapted to jet out and supply toward said workpiece the working fluid having lower pressure than the high-pressure working fluid;

jet-stream generating means disposed within said internal nozzle and supported in such a manner as to be vertically movable around an outer peripheral portion of said wire guide, so as to guide said wire electrode from said upper guide to said lower guide by means of a jet stream; and internal-nozzle driving means for supporting said internal nozzle in such a manner as to render said internal nozzle, together with said jet-stream generating means, vertically movable with respect to said external nozzle, so as to drive said internal nozzle vertically through fluid pressure, wherein said internal nozzle is driven by said internal-nozzle driving means so as to drive said jet-stream generating means engaging with said internal nozzle.

5. A wire electrical discharge machining apparatus in which a working fluid is interposed between a wire electrode and a workpiece to machine the workpiece by electrical discharge, comprising:

an upper guide and a lower guide which are respectively disposed above and below the workpiece and respectively incorporate wire guides for guiding said wire electrode; and a vertically movable internal nozzle and an external nozzle which are provided in at least one of said upper guide and said lower guide, said internal nozzle being adapted to jet out and supply high-pressure working fluid toward the workpiece, said internal nozzle housing a vertically movable jet nozzle therein, and said external nozzle being adapted to jet out and supply toward said workpiece the working fluid having lower pressure than the high-pressure working fluid, wherein a fin is provided on an outer peripheral portion of said wire electrode.

6. The wire electrical discharge machining apparatus according to claim 5, wherein said fin is inclined with respect to a central axis of said wire electrode.

* * * * *